United States Patent [19]

Jaffiol et al.

[11] Patent Number: 5,655,341
[45] Date of Patent: Aug. 12, 1997

[54] METHOD AND DEVICE FOR PRODUCING A SEAL CONTAINING AN INSERT, AT THE PERIPHERY OF A GLASS PANE, AND GLASS PANE OBTAINED

[75] Inventors: Franck Jaffiol, Nanterre; Jean-Jacques Olivier, Boulogne; Gérard Thomas, Pantin, all of France

[73] Assignees: Automobiles Peugeot, Paris; Automobiles Citroen, Neuilly sur Seine, both of France

[21] Appl. No.: 481,102

[22] Filed: Jun. 7, 1995

Related U.S. Application Data

[62] Division of Ser. No. 243,093, May 16, 1994, Pat. No. 5,464,575, which is a continuation of Ser. No. 963,276, Oct. 19, 1992, which is a continuation of Ser. No. 637,534, Jan. 4, 1991, abandoned.

[30] Foreign Application Priority Data

Jan. 4, 1990 [FR] France ................. 90 00055

[51] Int. Cl.[6] ................................. E06B 3/30
[52] U.S. Cl. ................... 52/204.54; 52/204.62; 52/800.15; 296/90; 296/96.15; 296/96.21
[58] Field of Search ............... 52/204.54, 204.72, 52/204.62, 800.14–800.16, 208; 296/90, 93, 96.21, 96.15

[56] References Cited

U.S. PATENT DOCUMENTS

| | | | |
|---|---|---|---|
| 4,249,517 | 2/1981 | Schroeder et al. | 52/800.14 X |
| 4,304,744 | 12/1981 | Stroud | 264/25 |
| 4,626,185 | 12/1986 | Monnet | 425/110 |
| 4,662,113 | 5/1987 | Weaver | 49/404 |
| 4,675,139 | 6/1987 | Kehe et al. | 264/26 |
| 4,925,511 | 5/1990 | Ikeda et al. | |
| 5,069,835 | 12/1991 | Oriez | 264/26 |
| 5,069,852 | 12/1991 | Leone et al. | |

FOREIGN PATENT DOCUMENTS

| | | | |
|---|---|---|---|
| 0 122 545 | 10/1984 | European Pat. Off. | |
| 0 127 546 | 12/1984 | European Pat. Off. | |
| 249560 | 12/1987 | European Pat. Off. | 296/93 |
| 2 251 421 | 6/1975 | France | |
| 2 627 721 | 9/1989 | France | |
| 1235164 | 9/1965 | Germany | 296/93 |
| 63-45012 | 2/1988 | Japan | |
| 63-57213 | 3/1988 | Japan | |
| 63-297009 | 12/1988 | Japan | |
| 2-175419 | 7/1990 | Japan | |
| 1492931 | 11/1977 | United Kingdom | 52/800.14 X |

OTHER PUBLICATIONS

Translation of the Specification for European Patent No. 0 333 538 (Application No. 89 400 533.9.

Primary Examiner—Carl D. Friedman
Assistant Examiner—Yvonne Horton-Richardson
Attorney, Agent, or Firm—Burns, Doane, Swecker & Mathis, L.L.P.

[57] ABSTRACT

A plastic material is injected in the fluid state into a flexible closed mold (2, 3) comprising a molding cavity (6) in which is placed the edge of the glass pane (5). The plastic material is injected into the cavity (6) of the mold in the inert state and is then activated by high-frequency electromagnetic radiation or by microwave radiation. An insert (22) is placed in the cavity (6) of the mold before the injection of the plastic material. The injection and the subsequent hardening of the plastic material are carried out inside the cavity of the mold (6) [sic] in which cavity are arranged, during these operations, the edge (5a) of the glass pane (5), and the insert (22) in their definitive relative position on the glass pane in the shaped state. The invention can be used to produce glass panes for motor vehicles, comprising inserts consisting of trim strips, for a decorative purpose, or of elements such as ducts, cables or fastening screws having a functional purpose.

3 Claims, 1 Drawing Sheet

METHOD AND DEVICE FOR PRODUCING A SEAL CONTAINING AN INSERT, AT THE PERIPHERY OF A GLASS PANE, AND GLASS PANE OBTAINED

This application is a divisional of application Ser. No. 08/243,093, filed May 16, 1994, U.S. Pat. No. 5,464,575, which is a continuation of application Ser. No. 07/963,276, filed Oct. 19, 1992, which is a continuation of application Ser. No. 07/637,534, filed Jan. 4, 1991, now abandoned.

The invention relates to a method for producing a seal from a hardenable plastic material containing an insert and integrally connected to at least part of the periphery of a glass pane.

The invention is applied, in particular, to glass panes used on motor vehicles such as passenger vehicles, tractors, lorries or buses. These glass panes can be made from any piece of toughened or compound mineral glass or of an organic material such as polymethylmethacrylate, or polycarbonate.

These glass panes can be fixed and can form, for example, windscreens, rear windows or rear vehicle structures, or alternatively can be movable and form side windows or sunroofs; in the case of sunroofs, the glass pane is integrally connected at its periphery to a rigid frame.

In most cases, these glass panes do not have a flat shape and, on the contrary, have a curve in one or two directions.

In the case where the glass pane is curved in a single direction, the curve is defined quantitatively by the value of the radius of a cylinder surrounding the curved glass pane. This radius is determined by measuring the deflection relative to a reference plane assumed by the glass pane when the latter rests unstressed on the reference plane. The value of this radius generally lies between 900 and 1200 mm.

Some glass panes have a double curve or double bulge, the amplitude of which can be defined quantitatively as the maximum value h which the deflection of the glass pane assumes relative to a reference plane when the periphery of the glass pane rests unstressed on this plane. The length of the deflection generally lies between 80 and 150 mm in the case of glass panes for motor vehicles.

In fact, in a more general manner, it will be possible for the glass panes employed within the scope of the present invention to have a single or double curve corresponding to a deflection lying between 3 and 300 mm.

Glass panes for motor vehicles usually comprise a seal made from rubber or a plastic material arranged over all or part of the periphery of the glass pane. Such a seal can have a sealing function or form a cover concealing the edge of the glass pane. In the latter case, the sealing can be ensured by a line of glue inserted between the glass pane and the outer wall of the bodywork.

Various methods have been proposed for over-molding a seal made from rubber or plastic material on the peripheral part of a glass pane, these methods making it possible to obtain a seal which is perfectly adapted to the dimension of the glass pane and perfectly leak-tight.

Methods are known, for example, for molding a seal by high-pressure injection of materials such as EPDM rubber consisting of a mixture based on ethylene, propylene or diene monomer, other materials of the rubber type or alternatively thermoplastics.

Methods are also known for low-pressure molding of materials such as polyurethane or other reactive materials. These materials can be employed for producing seals by low-pressure injection, in particular using the method known under the name of RIM (Reaction Injection Molding).

These methods, whether carried out at high or low pressure, require the plastic material to be injected into the cavity of a mold made from a metal material such as aluminum or steel.

These methods therefore have difficulties in implementation in the case of curved glass panes on the edge of which the overmolding of the seal is performed by injection. These difficulties are greater the larger the curve of the glass panes.

In the case of a double-curve mineral-glass glass pane, commonly termed a spherical or bubble-shaped glass pane, virtually no deformation of the glass pane can be permitted during the molding of the seal. A deviation, even of a very small amplitude, relative to the nominal dimension of the mold can result in this case in the glass pane breaking when the mold is closed or when the plastic material is injected. It is then necessary to clean the mold carefully in order to remove all glass debris before carrying out a new injection operation. Such a cleaning operation is expensive since it puts the production tool out of action for a relatively long period of time. Furthermore, the metal surface of the cavities of the mold can be damaged by slivers of glass, or even by the friction of the peripheral edge of the glass pane if the dimensions of this glass pane lie outside the dimensional tolerances of the mold.

A method for producing a seal on the periphery of a glass pane by molding a plastic material in the fluid state around the glass pane has been proposed in a Patent Application No. 88-02492 filed on 29 Feb. 1988 by the companies AUTOMOBILES PEUGEOT and AUTOMOBILES CITROEN, in which the subsequent hardening of the seal is effected by activating the plastic material by electromagnetic radiation inside the mold.

The mechanism for hardening the plastic material can make use of gelling, vulcanization or crosslinking of the liquid plastic material which is activated by high- or very high-frequency radiation or by radiation of the microwave type.

A mold is used which is transparent to high-frequency radiation and to microwaves, and is preferably made from a flexible material such as a silicone elastomer.

Such a method is therefore perfectly suited to the case of glass panes having a curve, to the extent that the glass pane is placed between two parts of a mold made from a flexible material, on which parts a moderate pressure is exerted during the molding.

In the case of glass panes used in automobile construction, the need for including inserts in the seals arranged at the periphery of the glass panes is arising more and more frequently.

These inserts can have a purely decorative role or, on the contrary, fulfill certain useful functions, for example in the case of vehicles requiring the passage of electrical cables or conduits of various shapes along the seal of certain glass panes.

In the case of the production of a glass pane seal overmolded using the RIM method, it has already been proposed to arrange trim strips having a decorative purpose on the outer visible face of the seal, these trim strips being at least partially coated with plastic material during the molding of the seal.

In the case of parts made on units with a high production rate, the mold is made from aluminum or steel and the quality of the operation of overmolding the decorative trim strip depends on the accuracy of the dimensions of this trim strip and on the control of the pressure of the polyurethane-based reactive mixture during the injection and curing stage of the seal.

Indeed, perfect positioning and effective locking of the trim strip in a groove arranged in the cavity of the mold made from a rigid metal material requires a high dimensional accuracy during the manufacture of the trim strip.

Furthermore, if the injection pressure is not perfectly controlled, the trim strip is likely to be displaced inside the mold, and burrs of plastic material can move onto the surface of the trim strip and thus be visible from outside on the part in the finished state.

The object of the invention is therefore to provide a method for producing a seal made from a hardenable plastic material and integrally connected to at least part of the periphery of a mineral or organic glass pane, by injecting the plastic material in the fluid state into the cavity of a closed mold made from a flexible material and in which cavity is placed the edge of the glass pane, the plastic material being injected into the mold in the inert state and then activated by high-, very high- or ultra-high frequency electromagnetic radiation, this seal furthermore comprising an insert and this method being simple and very reliable to implement, irrespective of the type of insert to be placed in the seal and irrespective of the curve which the glass pane has.

To this end, the insert is placed in the mold before the injection of the plastic material, this injection and the subsequent hardening of the plastic material being carried out inside the mold in which are arranged, during these operations, the edge of the glass pane, and the insert, in their definitive relative position on the glass pane in the shaped state.

The invention also relates to a device for implementing the method for producing the seal containing an insert, and to the overmolded glass pane obtained.

In order to make the invention readily understandable, two embodiments of the method according to the invention will now be described by way of non-limiting example and with reference to the attached figures, in the case of inserts having different shapes and functions.

Figure 1:
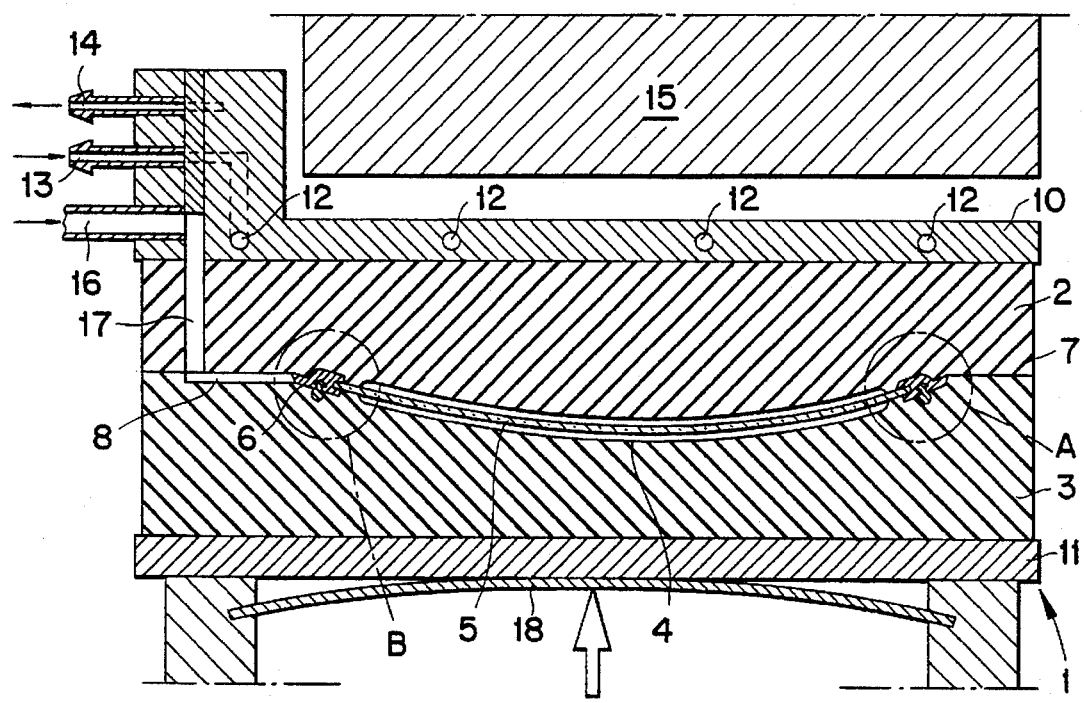
FIG. 1 is a view in section and in elevation of a molding and hardening device permitting the implementation of the method according to the invention for manufacturing a curved glass pane for a motor vehicle, having a seal containing an insert.

In FIG. 1, a mold can be seen designated in a general manner by the reference numeral 1, comprising an upper part or punch 2 and a lower part or die 3 having two faces intended to confront each other in the closed position of the mold, as shown in FIG. 1, these faces being machined so as to define between them an arched space 4 intended to receive the curved glass pane 5 and a peripheral molding cavity 6 for producing a seal made from plastic material by overmolding on the peripheral edge of the glass pane 5.

The punch 2 and the die 3 comprise, at their periphery, plane closing surfaces which are applied against each other with a certain pressure so as to effect the leaktight closing of the mold along the parting line 7.

The punch and the die are furthermore machined so as to form a channel 8 for supplying plastic material in the fluid state to the cavity 6 for molding the seal.

The outer faces of the punch 2 and of the die 3 are in contact with aluminum plates 10 and 11 respectively. These plates make it possible to transmit high-frequency radiation, generated by a generator 15, to the two parts of the mold and to a mass of plastic material injected into the cavity 6.

Moreover, the aluminum plates 10 and 11 are pierced with channels such as 12 through which a cooling liquid, such as water, circulates when the aluminum plates are subjected to the high-frequency radiation produced by the generator 15.

All the channels 12 are connected to two nozzles 13 and 14 respectively supplying the channels and recovering the cooling water.

Furthermore, the upper plate 10 in contact with the punch 2 carries a nozzle 16 communicating with the injection channel 8 of the mold by a joining channel 17 traversing part of the plate 10 and the punch 2.

The upper part of the mold consisting of the punch 2 and the plate 10 is connected to the fixed frame of the installation, and the lower part of the mold consisting of the die 3 and the plate 11 is connected, via this plate 11, to a pressing element 18 capable of exerting an upwardly directed vertical force on the plate 11 and the die 3, so as to ensure a sufficient contact pressure between the two parts of the mold, along the parting line 7, during the overmolding operation.

Figures 2, 3:
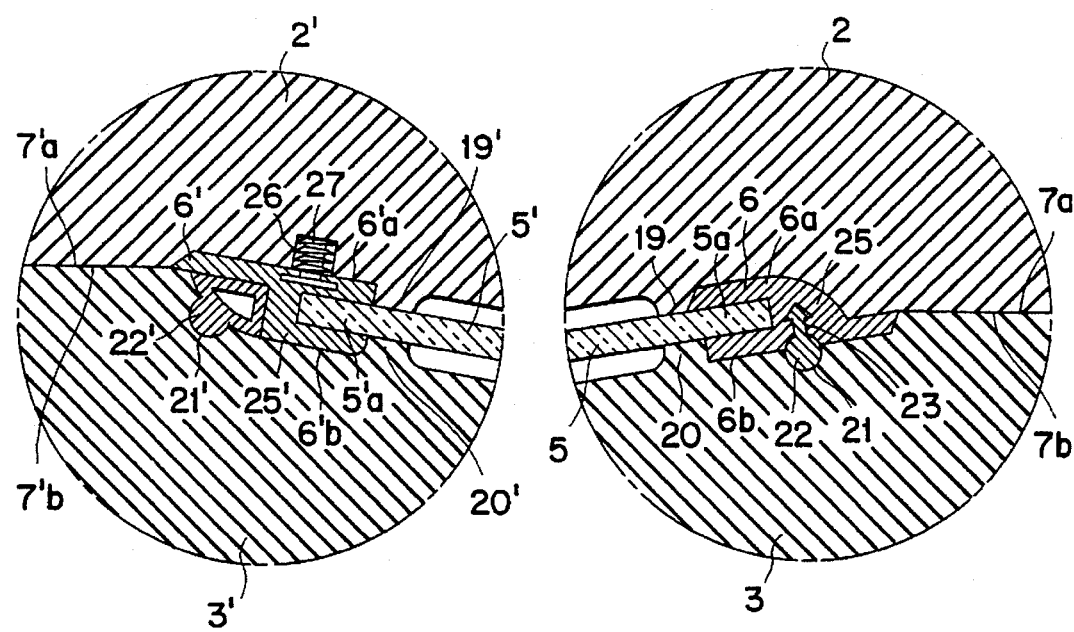
FIG. 2 is a view on a larger scale of the portion of the cavity of a mold for producing a seal containing an insert according to a first embodiment.
FIG. 3 is a view on a larger scale of the portion of the cavity of a mold for producing a seal according to a second embodiment containing a plurality of inserts.

The section of a mold such as that shown in FIG. 1 has been shown on a large scale in FIG. 2, at the level of the peripheral molding cavity 6 for a seal made from plastic material.

The zone of the mold shown in FIG. 2 corresponds to the zone A shown in FIG. 1.

The punch 2 and the die 3 are machined so as to have, in succession from the periphery towards the inside, two plane bearing surfaces 7a and 7b intended to form the parting line 7, and two sunken surfaces 6a and 6b intended to form the molding recess or cavity 6 in the closed position of the mold.

The molding cavity 6 for the seal is defined toward the inside by two projecting annular parts 19 and 20 of the punch 2 and the die 3 respectively bearing on the opposite faces of the glass pane 5, in the vicinity of its periphery, in the closed position of the mold.

The glass pane 5 has a peripheral part 5a projecting into the molding cavity and around which the molding of the plastic material is carried out.

The upper surface of the die 3 is, furthermore, machined at the level of its sunken part defining the molding cavity 6 in order to form an annular groove 21, the section of which has the shape of a portion of a circle.

Before carrying out the molding, the punch 2 and the die 3 being in a position spaced apart from each other, a trim strip 22 is introduced into the groove 21.

The punch 2 and the die 3 are made from a flexible material such as a silicone elastomer.

The trim strip 22 can be made from PVC plasticized and bulk-pigmented. The section of the trim strip 22, of a circular shape, has a radius substantially equal to or slightly greater than the radius of the groove 21 of the die 3. In this way, the trim strip 22 engaged in the groove 21 is held perfectly in a fixed position on the die 3 by virtue of the elasticity of the material of the mold.

The trim strip 22 comprises a part projecting into the molding recess 6, comprising hooking elements 23, for example in the shape of a sea anchor or any other shape permitting a definitive fixing of the trim strip 22 in the plastic material forming the seal of the glass pane 5, after solidification of this plastic material. The trim strip 22 can comprise any bumps or undercut parts enabling an efficient anchorage of the trim strip in the material of the seal to be effected.

For the implementation of the method according to the invention, with the mold open, a curved glass pane 5 is placed on the upper surface of the die 3, at the level of the opening 4. The edge of the curved glass pane 5 rests on the annular rim 20 of the die, so that a part 5a forming the glass pane rim projects out from the annular rim 20.

The trim strip 22 is placed as described above and the mold is closed so that the punch and the die occupy the positions shown in FIGS. 1 and 2. The annular rim 19 of the punch 2 bears on the periphery of the glass pane 5, opposite the rim 20. The plane surfaces 7a and 7b themselves come into contact and, when the mold is squeezed using the pressing element 18 acting on the die via the plate 11, the molding cavity 6 is closed in a sealed manner over its entire periphery, with the exception of the opening of the channel 8 opening out into this molding cavity 6, and of a vent (not shown) intended, in a conventional manner, to remove the air bubbles.

The outer rim 5a of the glass pane 5, and the part projecting into the cavity 6 for the trim strip 22 are in a perfectly determined relative arrangement during the squeezing of the mold.

A PVC plastisol of a viscosity of 5000 mPa.s at 22° C. is injected via the nozzle 16 and the channels 17 and 8 into the molding cavity 6. The main constituents of this PVC plastisol are as follows:

| | |
|---|---|
| PVS LUCOVYL PB 1302 (ATOCHEM) | 100 parts |
| $C_9$-$C_{11}$ linear phthalate plasticizer | 50 parts |
| Stabilizer (organic salt of barium and zinc) | 2 parts |
| Octyl epoxy stearate | 5 parts. |

Other constituents such as pigments and substances enabling the viscosity of the plastic material to be adjusted are introduced into the mixture in an adequate quantity for obtaining the desired color of the seal and a sufficient viscosity of the plastic material at the time of its injection.

The plastisol is injected for a period of approximately 20 seconds into the cavity 6 of the mold, a closing force of approximately 1 tonne being exerted by the pressing element 18 on the plate 11 and the die 3.

High-frequency electromagnetic radiation is applied to the mold for a period of one minute by the generator 15 and via the aluminum plates 10 and 11.

In a preferred embodiment of the invention, electromagnetic radiation of a frequency of 27.12 MHz is applied.

The mold, remaining in the closed position, is cooled for a period substantially equal to 2 minutes. The mold is then opened and the part is removed. This part consists of the curved glass pane 5 comprising, at its periphery, an overmolded seal 25 consisting of the plasticized PVC plastisol and having a hardness of 80 Shore A.

The trim strip 22 projects slightly and can be seen on the visible side of the seal 25, so that this bulk-colored trim strip forms a decorative element of the seal 25. The perfect sealing of the recess 6 of the mold in the closed position makes it possible to avoid any leakage and any burr of plastic material around the trim strip 22, on the periphery of the glass pane 5 at the level of the rims 19 and 20 and in the parting line 7.

Indeed, a very good sealing is obtained as a result of the two parts of the mold being made from an elastomer, the bearing surfaces of which come into sealing contact with corresponding bearing surfaces, made from elastomer, glass or PVC, and as a result of the fact that the plastic material forming the seal 25 is injected into the cavity 6 of the mold at a low pressure (a few bars).

Furthermore, the curved glass pane 5 is not subjected to any substantial stresses during the molding and suffers no damage on its peripheral part inside the molding cavity 6.

The relative position of the trim strip 22 and of the peripheral part 5a of the glass pane is perfectly determined and maintained during the molding and the hardening of the seal.

The trim strip 22 could also have a function other than a decorative function. It could, for example, form a local padding enabling the sealing of the seal 25 to be improved when the glass pane is installed on a motor vehicle. The material forming the trim strip 22 is then preferably a material with a cellular structure. Such a material advantageously has a tangent of the dielectric loss angle less than or equal to $10^{-3}$, at the frequency of the microwaves or of the high-frequency waves.

The material of the insert is thus prevented from heating up during the hardening of the seal.

The material of the insert can consist of EPDM rubber or silicone.

Part of the section of the mold shown in FIG. 1, capable of corresponding to the detail B of this figure, can be seen in FIG. 3 in the case of a second embodiment of the invention.

FIG. 3 shows an alternative embodiment of the molding recess 6' for a seal at the periphery of a glass pane 5' of curved shape which can be similar to the glass pane 5 shown in FIG. 1.

The upper part 2' of the mold constitutes a punch and the lower part 3' a die. These elements are substantially identical, in their general shape and in their structure, to the elements 2 and 3 shown in FIG. 1.

The lower surface of the punch 2' is machined in order to form, in succession from the outside towards the inside of the mold, a plane seal bearing surface 7'a, a sunken part 6'a and an annular rim 19'.

The die 3' comprises an upper surface machined in order to form, in succession, a plane seal bearing surface 7'b intended to be applied against the bearing surface 7'a when the mold is closed, a sunken part 6'b and an annular rim 20'.

The die 3' comprises, in addition, in its sunken part 6'b, an annular recess 21' having a section in the shape of a portion of a circle.

Before closing the mold, with the punch and the die separated, an insert 22' is placed in the sunken part 6'b of the surface of the die 3'. This insert is made in the form of a hollow tube or a tubing having a cross-section in the shape of a curved-line triangle or a portion of a circle. This insert 22' comprises a projecting annular fixing element intended to be engaged in the annular opening 21' in order to retain the insert 22' in the molding cavity 6' before the mold is closed and during the overmolding of a seal made from plastic material in the cavity 6' of the mold.

The curved glass pane 5' is placed in such a way that it has a peripheral part 5'a projecting into the molding cavity 6' of the seal.

Furthermore, the punch 2' of the mold is pierced with blind holes such that the hole 26 into which can be engaged inserts consisting of studs such as the stud 27 having a head with a widened diameter engaged in the cavity 6' of the mold and a threaded part outside the cavity of the mold and engaged in a blind hole The production of the seal 25' made from plastic material is carried out as above, by injecting a plastisol, the composition of which can be identical to the composition given above, into the molding cavity 6'. The plastisol in the liquid state is then gelled by a high-frequency treatment lasting one minute, it being possible for this high frequency to be 27.12 MHz. The removal from the mold takes place as above, after a cooling period of approximately two minutes inside the mold in the closed position.

The part obtained is a curved glass pane comprising, at its periphery, an overmolded seal made from plasticized PVC of a hardness of approximately 80 Shore A. The part comprises, on the outer face of the seal, in other words on the face of the seal opposite the face arranged against the bodywork, an integrated tube 22' which is absolutely integral with the seal 25' and can occupy all or part of the periphery of the glass pane 5'.

The tube 22' can permit the passage of electrical cables, for example cables used to defrost the rear window of a motor vehicle. It can also serve to convey washer liquid to a spraying nozzle placed at the base of the rear wiper of the vehicle. It is provided with a decorative trim strip consisting of the part of the seal formed in the recess 21'.

The stud 27, the widened head of which constitutes an insert embedded in the plastic material of the seal 25', has a threaded part projecting relative to the seal 25' and which can serve to fix the window pane 5' onto the bodywork of the vehicle, using a nut.

It is clear that the mold comprising elements such as those shown in FIG. 3 has the same advantages as the mold described above comprising the elements shown in FIG. 2, in terms of the ease of placing the inserts, the accuracy in the positioning of these inserts and the quality of the seal 25' produced, to the extent that the punch 2' and the die 3' are made from a flexible material such as a silicone elastomer, and that the plastisol is injected under a low pressure into the recess 6'.

It is clear that the invention is not limited to the embodiments which have been described.

It is thus possible to use the method according to the invention to produce glass panes comprising decorative or functional inserts other than those which have been described. Such inserts may consist of trim strips, tapes, rods, pads, decorative moldings, distinctive elements such as letter symbols, as long as the heat generated by the electromagnetic radiation does not cause any damage to the decorative element made in the form of an insert.

The inserts can also consist of functional elements such as electrical cables, tubes or other hollow bodies, centering studs enabling the glass pane to be positioned correctly on the bodywork by screwing in with a nut or any other fixing element enabling the glass pane to be mounted on the bodywork of the vehicle.

The closing force of the tool and the injection time of the reactive liquid consisting, for example, of a plastisol can vary according to the size of the seal and of the glass pane on which the seal is made.

For a fixed motor vehicle window, it will preferably be possible for this force to vary between 1 and 3 tonnes, and for a rear motor vehicle window between 3 and 5 tonnes.

In the embodiment of FIG. 3, it could be envisaged for the tube 22' to be placed on the side of the bodywork, by placing it on the same side as the stud 27. This stud 27 could, if required, be dispensed with and the glass pane bonded adhesively onto the bodywork. The tube 22' would thus not be visible.

The injection time for the reactive plastic material such as the plastisol can vary between 20 and 90 seconds. The injection operation can be accelerated and facilitated by applying a vacuum to the cavity of the mold which is being filled.

The period for which the high-frequency electromagnetic waves, or the microwaves are applied depends on the thickness of the seal to be made and on the dielectric loss coefficient of the liquid material which is being solidified by gelling, vulcanization or polymerization.

In the case of a PVC plastisol, the period for which it is exposed to radiation at a frequency of 27.12 MHz is 20 to 90 seconds.

In a general manner, it will be possible to refer to the French Patent Application 88-02492 with regard to the type of electromagnetic radiation, the nature of the tools and the materials employed for forming the seal.

High-frequency radiation with a frequency which can be 13.56 MHz, 27.12 MHz or 40.68 MHz, or alternatively radiation of the microwave type with a frequency which can be 433 MHz, 850 MHz, 915 MHz or 2450 MHz will preferably be used.

It will be possible for the parts of the mold defining the molding cavity to be made, preferably, from a silicone elastomer which can be vulcanized at ambient temperature or hot vulcanized, or from any other flexible or semi-rigid material transparent to high-frequency radiation such as polytetrafluoroethylene, polypropylene and epoxy resin concretes of specially adapted formulation.

In order to form the seal, it will be possible to use plastic materials which are liquid in the absence of heating by dielectric loss and which can be gelled, polymerized or crosslinked under the effects of high-frequency waves, or microwaves. PVC-based plastisols and blocked or highly retarded polyurethane systems which are liquid at ambient temperature will preferably be used.

It is also possible to envisage the use of rubber, as long as latexes having an appropriate formula are used as the reactive liquid.

In a general manner, the invention can find numerous applications in the field of automobile construction, in all cases where an insert with a decorative or functional purpose is to be associated with the seal of a glass pane.

We claim:

1. A glass pane, in particular for a motor vehicle, comprising:

a curved window pane made from mineral or organic transparent glass, the curved window pane having a deflection equal to at least 3 mm;

a seal made from plastic material and integrally connected to at least part of the periphery of the window pane; and at least one insert included in the seal, wherein the insert includes a means for supplying washing liquid for washing the glass pane.

2. A glass pane, in particular for a motor vehicle, comprising:

a curved window pane made from mineral or organic transparent glass, the curved window pane having a deflection equal to at least 3 mm;

a seal made from plastic material and integrally connected to at least part of the periphery of the window pane; and at least one insert included in the seal, wherein the insert includes a means for supplying electrical power.

3. The glass pane as claimed in claim 2, wherein the means for supplying electrical power is an electrical cable for supplying electrical power to an electrical device of the motor vehicle.

* * * * *